(12) United States Patent
Nestler et al.

(10) Patent No.: US 8,645,866 B2
(45) Date of Patent: Feb. 4, 2014

(54) DYNAMIC ICON OVERLAY SYSTEM AND METHOD OF PRODUCING DYNAMIC ICON OVERLAYS

(75) Inventors: Roger H. Nestler, Clay, NY (US);
Daniel T. Dang, Jamesville, NY (US)

(73) Assignee: Exelis Inc., McLean, VA (US)

( * ) Notice: Subject to any disclaimer, the term of this patent is extended or adjusted under 35 U.S.C. 154(b) by 280 days.

(21) Appl. No.: 12/825,532

(22) Filed: Jun. 29, 2010

(65) Prior Publication Data
US 2011/0320477 A1    Dec. 29, 2011

(51) Int. Cl.
*G06F 3/048*  (2013.01)
*G06F 17/30*  (2006.01)

(52) U.S. Cl.
USPC ........... 715/837; 715/763; 715/765; 707/784; 707/822

(58) Field of Classification Search
None
See application file for complete search history.

(56) References Cited

U.S. PATENT DOCUMENTS

| | | | |
|---|---|---|---|
| 6,100,888 A | | 8/2000 | Gourdol et al. |
| 7,231,611 B2 | | 6/2007 | Kumhyr et al. |
| 2003/0191989 A1* | | 10/2003 | O'Sullivan ..................... 714/47 |
| 2004/0119756 A1* | | 6/2004 | Kumhyr et al. ............... 345/837 |
| 2005/0240878 A1* | | 10/2005 | Anthony et al. .............. 715/765 |
| 2010/0174751 A1* | | 7/2010 | Kawano et al. ............... 707/784 |

FOREIGN PATENT DOCUMENTS

| | | |
|---|---|---|
| JP | 2002108672 | 4/2002 |
| JP | 2004054839 | 2/2004 |
| JP | 2005174211 | 6/2005 |
| JP | 2007293460 | 11/2007 |
| WO | 2007105037 A1 | 9/2007 |

OTHER PUBLICATIONS

European Search Report EP11174672.3-1243, Dec. 6, 2011, 6 pages.
Office Action in corresponding Japanese Application No. 2011-158405, mailed May 17, 2013, along with an English translation.

\* cited by examiner

*Primary Examiner* — Sangwoo Ahn
(74) *Attorney, Agent, or Firm* — Edell, Shapiro & Finnan, LLC

(57) ABSTRACT

A dynamic icon overlay system of a present invention embodiment dynamically generates icon overlays to be applied to a primary file icon of a target file. The icon overlays convey information regarding the target file and are relevant to an end user. The icon overlay system determines icon overlays to be applied to the primary file icon based on attributes associated with an end user of the target file that are correlated with attributes of the target file itself. The system applies the icon overlay to the primary icon and displays the primary icon with the applied icon overlay at an end user system. The applied icon overlay for the same target file may vary for different end users based on user attributes.

24 Claims, 7 Drawing Sheets

| DOCUMENT TYPES | | DOCUMENT ACCESS | | FEATURE ACCESS | |
|---|---|---|---|---|---|
|  | LEGAL |  | NONE |  | NONE |
|  | ENGINEERING |  | READ-ONLY |  | LIMITED |
|  | FINANCE |  | READ-WRITE |  | ALL |

DYNAMIC ICON OVERLAY SYSTEM AND METHOD OF PRODUCING DYNAMIC ICON OVERLAYS

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided for by the terms of contract No. FA8750-08-C-0114 awarded by the Department of Homeland Security (DHS).

BACKGROUND OF THE INVENTION

1. Technical Field

The present invention embodiments pertain to icon overlays. In particular, the present invention embodiments pertain to dynamically generating icon overlays for a file icon based on attributes associated with an end user of the file.

2. Discussion of Related Art

Icon overlays are small graphics superimposed over a file's primary icon. An icon overlay provides a visual cue that can convey additional file attributes. For example, one conventional icon overlay utilizes a 'shortcut' icon overlay (rendered as an arrow) to indicate that the file is actually a shortcut (i.e., a link to another file). Other conventional icon overlays designate the state of a file which has been obtained from a central file repository. For example, an icon overlay including an orange caution sign is used to denote that a file has been modified, an icon overlay including a green check is used to denote that a file is unmodified, an icon overlay including a blue plus sign ('+') is used to denote that a file has been added, and an icon overlay including a red 'X' is used to denote that a file has been deleted.

The algorithms used to select conventional icon overlays have traditionally been limited to simple properties of the file (e.g., linked, shared, modified, etc), which provides adequate functionality to indicate a property or a state of a file to a user. Consequently, conventional icon overlays rendered for a particular file appear identical no matter which user is viewing the overlays.

SUMMARY

Accordingly, an embodiment of the present invention dynamically generates icon overlays to be applied to a primary file icon of a target file. The icon overlays convey information regarding the target file and are relevant to an end user. The icon overlays applied to a primary file icon of a target file are based on attributes associated with an end user of the file that are correlated with attributes of the target file itself.

The above and still further features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
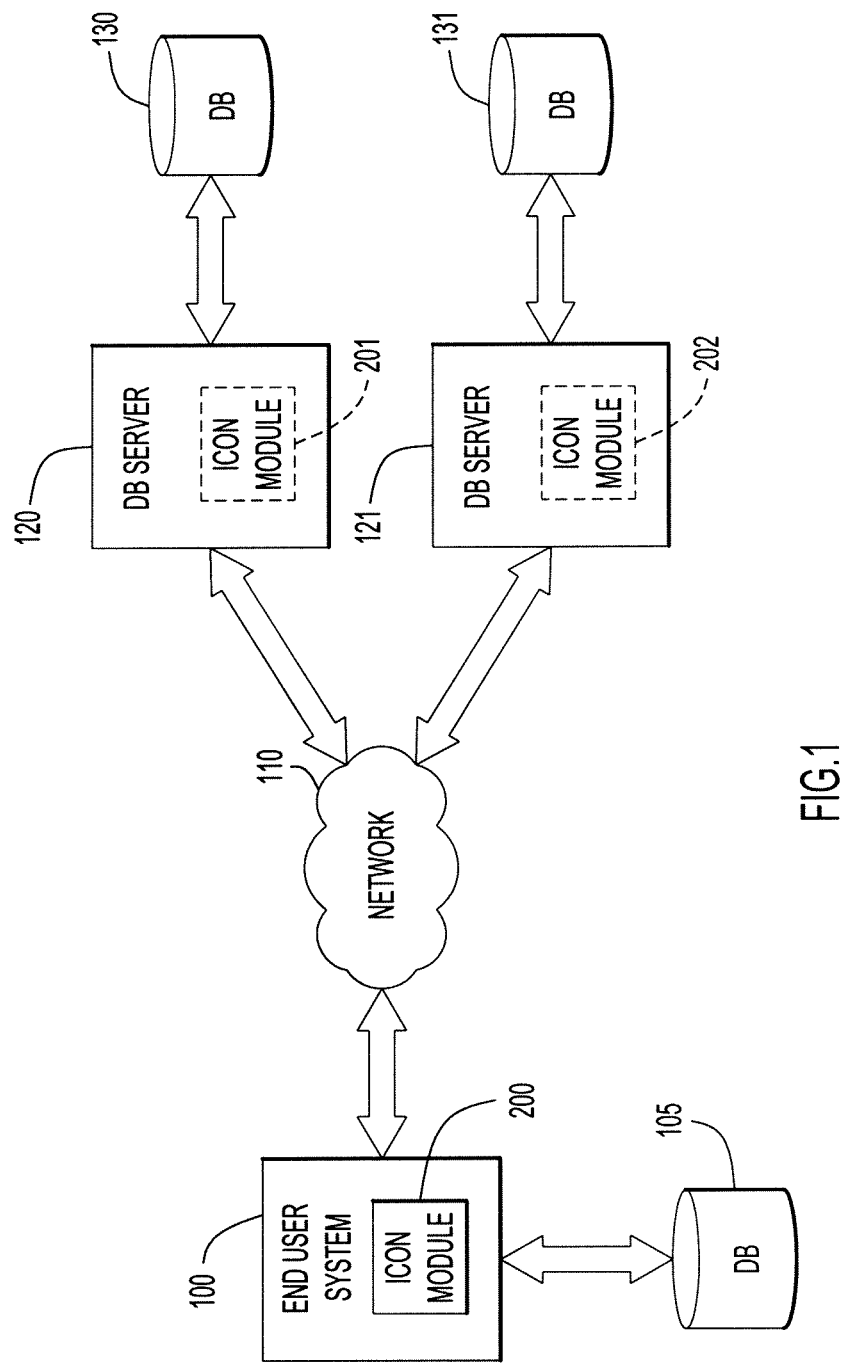
FIG. 1 is a block diagram of a dynamic icon overlay system according to an embodiment of the present invention.

Dynamic icon overlay systems according to embodiments of the present invention are generally dynamic and can adapt to changes in the environment that are extraneous to a target file. These dynamic icon overlay systems can display icon overlays that convey information relevant to a viewing user. Furthermore, these icon overlay systems can dynamically determine icon overlays based on policies or rules tied to correlations between user attributes and file attributes, and can dynamically indicate multiple contextual attributes (i.e., fuse or correlate data from multiple sources into a set of one or more icon overlays). For example, an indication of the type of user specific content a file contains, whether a user has a certain level of access to the file, and what privileges a user has regarding the file, may be provided by icon overlays.

In the case of documents residing in a digital rights management (DRM) system, different users may have different access privileges to various documents, whether those documents are imagery based, video based or text based files. Accordingly, present invention embodiments dynamically provide a set of targeted icon overlays that convey user specific information about the nature of a target file when viewed by a particular user. By way of example, in the case of a target file containing confidential information, a user with permission to access the file would have an icon overlay applied to the primary icon of the target file on the end user system indicating that the file contains confidential information and that the user has permission to open the file. By contrast, another user without permission to access the file would have an icon overlay applied to the primary icon of the target file on the end user system indicating that the file contains confidential information and that the user does not have permission to open the file.

Furthermore, different users having different job responsibilities may have different interests in the content of a particular target file. For example, a user with accounting responsibilities is likely to have an interest in any content of the target file regarding financial information. Whereas, a user with engineering responsibilities is likely to have no interest in the financial content, but rather, is likely to be interested in any technical content of the target file.

In the case of a target file containing both financial and technical information (e.g., project budget information, technical specifications for deploying equipment, etc.), the two users (one with accounting responsibilities and the other with engineering responsibilities) would see different icon overlays applied to the primary icon of the target file on their respective end user systems. In other words, for the one user with accounting responsibilities, an icon overlay indicating that the target file contains financial information would be selected and applied to the primary icon of the target file for the end user system. With respect to the other user with engineering responsibilities, an icon overlay indicating that the target file contains technical information would be selected and applied to the primary icon of the target file for the end user system.

Moreover, different users having different levels of authority within an organization may have different levels of permission with regard to a particular file. For instance, a user with management authority is likely to have permission with regard to releasing a document for general distribution or publication, while a user with engineering or contractor authority may not have permission to release the document. In this case, the user with management authority would have an icon overlay applied to the primary icon of the target file on the end user system to indicate that the user has permission to publish the target file. The other users (with engineering and contractor authority) would not have this overlay icon applied. By way of a further example, a user with engineering or accounting authority is likely to have permission to create, modify, or mark-up a document, while a user with contractor authority may only have permission to view the document (does not have permission to create, modify, or mark-up the document). In this case, the users with engineering and accounting authority would have an icon overlay applied to the primary icon of the target file on their respective end user systems to indicate that they have permission to modify the target file (i.e., read and write permission). The user with contractor authority would have an icon overlay applied to the primary icon of the target file on the end user system indicating that the user merely has rights to view the document (i.e., read-only permission).

Icon overlays may be part of an operating system (e.g., Microsoft Windows®) interface. Such operating system environments are extensible (e.g., via shell extensions) and use standard application development tools. Interfacing a new icon overlay handling procedure may be accomplished by: registering an overlay handler with the operating system, initializing the overlay handler, processing files, and assigning primary icons and icon overlays. Once a shell extension overlay handler is loaded into the operating system, it can be executed for each file that appears before a user as they interact with their desktop or end user system. The system, according to embodiments of the present invention, takes advantage of these features of the operating system in order to implement the handling of icon overlays with the end user system. The icon overlays, according to present invention embodiments, are determined based on an aggregate of user and file attributes, and the icon overlays convey information regarding the file that is relevant to the end user.

In order to determine and apply icon overlays according to embodiments of the present invention, a user of a target file is identified and attributes associated with the user and attributes associated with the target file are obtained. A user of the target file can be identified such that attributes associated with that user can be determined or retrieved. For example, a user can log into a system via a login script at an end user system and a 'user ID' entered via login can be used to determine user attributes stored in a user profile database (e.g., a corporate employee database). In this case, the user attributes associated with the user logged into the system would be used, according to embodiments of the present invention, to determine any icon overlays to apply to the primary icon for display on the end user system (e.g., an icon on the end user system desktop, icons of each file displayed in a window of an open folder, etc.).

Any type of communication (e.g., webservice, embedded data, socket, etc.) can be used to identify a user and to obtain attributes associated with the user and attributes associated with the file, so long as the obtained attributes accurately depict information about the file (e.g., file type, content of the file, file status, etc.) and information about the user (e.g., user permissions or rights for the particular file (e.g., creation, access, modification, etc.)). It should be understood that another user logged onto a separate end user system (e.g., personal computer (pc), personal digital assistant (pda), mobile phone, etc.) viewing the same file (which, for example, may be residing on a shared drive or in an shared folder) may see a completely different set of icon overlays applied to the primary icon for the target file because the user rights to the target file are based on the user's own particular attributes.

The dynamic icon overlay system of present invention embodiments basically determines icon overlays to apply to a primary icon of a target file based on an aggregate of user and file attributes. The dynamic icon overlay system is preferably implemented by a computer system 100 as illustrated, by way of example, in FIG. 1. Specifically, computer system 100 is typically implemented by a conventional personal or other suitable computer system, workstation, or electronic device preferably equipped with internal processing components (e.g., including a processor, memories and/or internal or external communications devices (e.g., modem, network cards, etc.)), user input devices (e.g., keyboard, mouse, touch screen, etc.) to enter information by the user, and output devices to display information to the user (e.g., display, monitor, touch screen, etc.). The computer system includes an icon module 200 that can be realized by hardware, software, or the combination thereof.

Computer system 100 includes software (e.g., operating system, icon module software, etc.) and appropriate components (e.g., processor, disk storage or hard drive, etc.) including sufficient processing and storage capabilities to effectively execute that software. The icon module software may be implemented in any programming language that is compatible with and conforms to the host operating system's rules and procedures for creating and/or extending its native icon and icon overlay creation and display functionalities. For example, the icon module software can be implemented in an extension programming language (e.g., Windows Power-Shell®), while the computer system may include any platform that supports such extensible programming languages (e.g., Unix®, Windows®, Macintosh®, etc.). The computer system 100, under software control, basically implements the dynamic icon overlay system of present invention embodiments for determining icon overlays to apply to a primary icon of a target file based on an aggregate of user and file attributes.

In one embodiment, computer system 100 preferably operates as a stand-alone tool. However, the dynamic icon overlay system may alternatively be in the form of an embeddable system (e.g., within another system, as an embeddable software component within other software, etc.), or function as a server 120 in communication over a network 110 with client or user systems 100 to process client requests for dynamic icon overlays.

Furthermore, the functions of icon module 200 can be dispersed across a network 110 for determining a set of icon overlays to be applied to a primary icon of a target file at an end user system 100. For example, one or more remote icon modules 201, 202 of different servers 120, 121 may communicate over network 110 and function together with icon module 200 of an end user system 100 to determine a set of icon overlays (in whole or in part) to be applied to a primary icon of a target file. The icon overlay module software may be available on a recordable medium (e.g., magnetic, optical, floppy, DVD, CD, etc.) or in the form of a carrier wave or signal for downloading from a source via a communication medium (e.g., bulletin board, network, WAN, LAN, Intranet, Internet, etc.).

In general, the icon overlay system, identifies or retrieves one or more of: the identity of a target file, the identity of an end user, attributes associated with the end user, and attributes associated with the target file (e.g., information about content of the target file), and determines or selects the most appropriate icon overlays to be applied to a primary icon of the target file and displayed to the end user. The appropriate icon overlays can be determined or selected in various ways. For example, icon overlays selected to be applied could be dictated by a remote application server, web service, or database.

Figure 2:
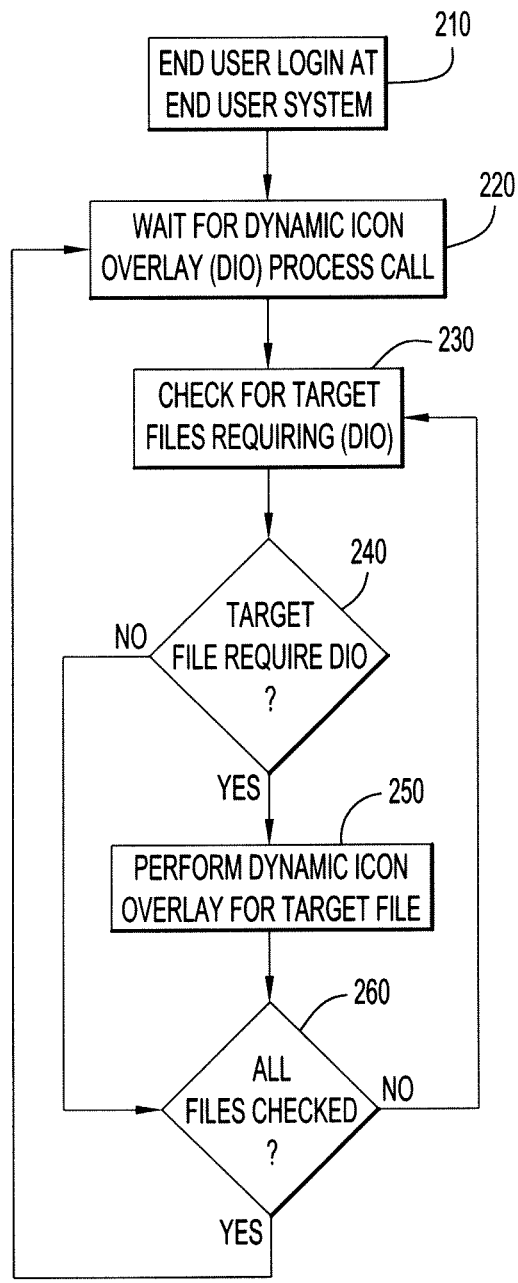
FIG. 2 is a procedural flow chart illustrating the manner in which the dynamic icon overlay system performs a dynamic icon overlay process according to an embodiment of the present invention.

The manner in which the dynamic icon overlay system of FIG. 1 performs dynamic icon overlaying, according to an embodiment of the present invention, is illustrated in FIG. 2. Initially, the system includes various software modules or units (e.g., icon module 200, routines, procedures, etc.) to control a computer system to perform icon overlay processing tasks as described above. However, the modules or units may alternatively be implemented by any individual one or combination of circuitry, software modules and/or hardware modules to perform the functions described below.

Initially, an end user logs into end user system 100, at step 210. Logging into the end user system can be carried out in various ways. For example, the user may log in during a launch of an operating system or application of end user system 100. The dynamic icon overlay system waits for a dynamic icon overlay process call, at step 220. The process call may be initiated in numerous ways. For example, when the end user first boots or logs into the end user system 100, the operating system displays a desktop including primary icons of user documents and applications (e.g., shortcuts to applications). The dynamic icon overlay process is initiated during the display of the desktop to display the primary icons of the user documents and applications with the appropriate dynamic icon overlays. By way of a further example, the user opens a shared network folder containing shared documents residing in database 130 via database server 120 over network 110. The dynamic icon overlay process is initiated when the folder is opened and a window displays primary icons of documents and applications stored in the folder.

Once the dynamic icon overlay process has been initiated, the dynamic icon overlay system checks for target files requiring dynamic icon overlays, at step 230. The target files can be checked to determine whether they require icon overlays in numerous ways. For example, the dynamic icon overlay system compares a file name of a target file to file names stored in a database and indicated as requiring DIO (e.g., a list of file names stored in a content repository that require DIO). By way of a further example, the dynamic icon overlay system compares a file type of a target file to a list of file types (e.g., a list of image files (e.g., JPEG, GIF, BMP, etc.), executables (e.g., .EXE, etc.), etc.) indicated as requiring DIO.

If the target file requires DIO, the dynamic icon overlay performs the DIO process for the target file, at step 250. The dynamic icon overlay system performs the DIO process by: 1) identifying an end user and a target file, 2) retrieving a primary icon of the target file, 3) retrieving user attributes, 4) retrieving file attributes, 5) determining at least one overlay icon to apply based on an aggregate of user and file attributes, 6) applying the at least one icon overlay to the primary icon, and 7) displaying the primary icon with that at least one applied icon overlay. The dynamic icon overlay system retrieves the primary icon by copying the icon image of an icon displayed on the desktop of the end user system 100, and retrieves the user and file attributes by accessing records of a content repository stored in database 131 via database server 121 over network 110.

The dynamic icon overlay system determines the at least one overlay icon to be applied by comparing certain user attributes with certain file attributes to a policy established by a database administrator and stored in the content repository. The system applies the at least one icon overlay to the primary icon by retrieving an image file of the determined icon overlay from the content repository and superimposing the icon overlay image file on the copy of the primary icon. The dynamic icon overlay system displays the primary icon with the at least one applied icon overlay by displaying the primary icon with the superimposed icon overlay image in place of the original icon on the desktop of the end user system 100. The process of performing dynamic icon overlay for a target file (e.g., step 250 of FIG. 2) is described in greater detail below with regard to FIG. 3. Once the DIO process is complete for the target file, a determination is made as to whether all files have been checked, at step 260.

If the target file does not require DIO, the dynamic icon overlay system skips the DIO process, at step 250, and determines whether all files have been checked, at step 260. If it is determined that not all of the files have been checked at step 260, the dynamic icon overlay system returns to step 230 to check for further target files requiring DIO. However, if it is determined that all files have been checked at step 260, the dynamic icon overlay system returns to step 220 and waits for a further DIO process call.

Figure 3:
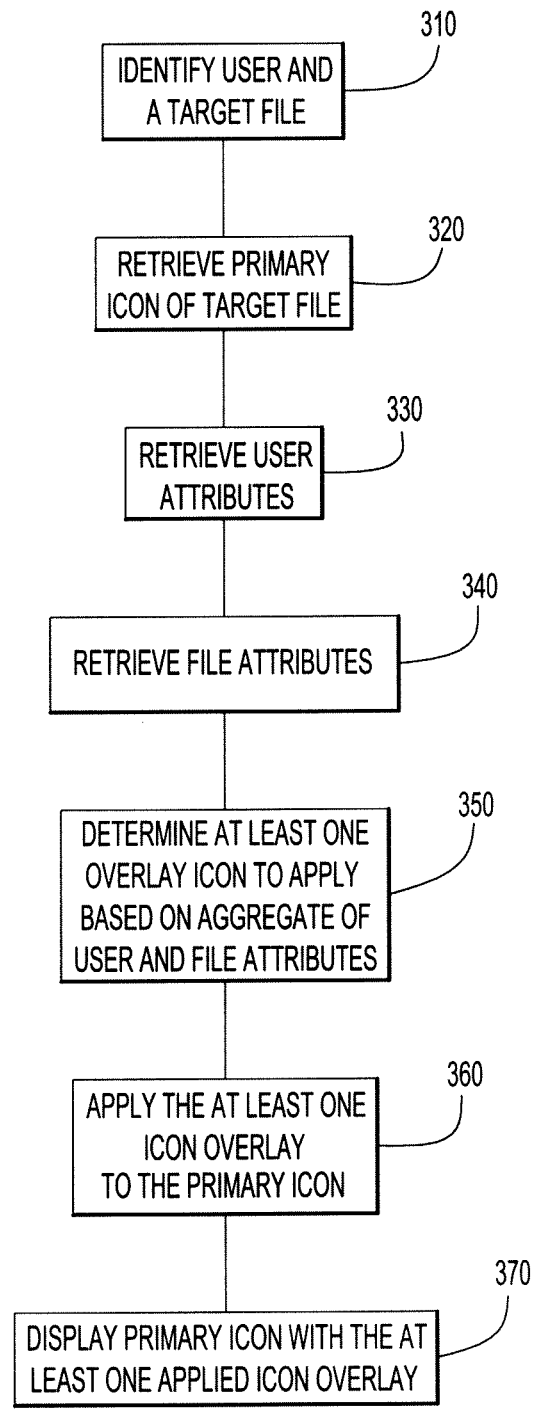
FIG. 3 is a procedural flow chart illustrating the manner in which the dynamic icon overlay system determines an icon overlay to be applied to a primary icon of a target file according to an embodiment of the present invention.

The manner in which dynamic icon overlaying is performed for a target file (step 250 of FIG. 2) according to an embodiment of the present invention is illustrated in FIG. 3. Initially, the icon overlay module identifies a user and a target file at step 310. A user may be identified by capturing a user's ID during system login or by prompting the user for identification. A target file may be identified via a lookup table in a database (e.g., a database including file names), by the file having a primary icon displayed on a desktop of the end user system, or by having a primary icon appear in a portion of the display of the end user system (e.g., an icon displayed in an open folder of Windows Explorer®).

At step 320, the icon overlay system retrieves a primary icon of the target file. For example, the icon overlay system retrieves an image file of the primary icon of the identified target file via an overlay handler of the operating system of end user system 100. As a further example, the icon overlay system retrieves an image file corresponding to the target file from a database. A copy of the image file is stored locally in the end user system memory, in a local database 105 accessible via a local network, or in a network database 130 accessible over a wide area network 110 via a database server 120.

User attributes associated with the identified user are retrieved at step 330. These user attributes can pertain to any aspect of the user, and may be obtained in various ways such that the attributes provide information about the user and are correlated with attributes of the file. User attributes include, for example, employee profile records contained in a corporate database (e.g., employee id, location, department, job title, grade level, job responsibilities, etc.).

It is to be understood that user attributes are not limited to information merely regarding the user. For example, user attributes may include information regarding the end user system (e.g., type of device, media access control (mac) address, global positioning system (GPS) location, security level of a current network connection of the end user system, etc.). The icon overlay system retrieves user attributes by obtaining employee records from a database. The employee records being stored locally in the end user system memory, in a local database 105 accessible over a local network, or in a network database 131 accessible over a wide area network 110 via a database server 121. As a further example, the icon overlay system retrieves user attributes by querying the end user system 100 or network components of the wide area network 110 for information (e.g., the mac address of the end user system, the current GPS coordinates of the end user system, the security level of the current network connection, etc.).

File attributes associated with the target file are retrieved at step 340. These file attributes can pertain to any aspect of the file and may be obtained such that the attributes provide information about the file and are correlated with the user attributes retrieved at step 330. File attributes include, but are not limited to: file properties (e.g., document type, shared status, document protection status, etc.); content of the file (e.g., financial data, engineering specifications, legal information, etc.); and access privileges of the file content.

The icon overlay system retrieves user and file attributes, according to an embodiment of the present invention, by consulting a content repository containing information regarding the user and the target file. The content repository may be incorporated, either locally or remotely and can be accessed in a number of ways (e.g., via Service Oriented Architecture (SOA), via a client/server model using socket connections, via a proprietary database using proprietary mechanisms for communications, etc.) such that icon overlays are determined in a dynamic way. In other words, details about the user and file attributes are stored in a content repository. When it is time to determine the icon overlays to apply, the content repository is consulted (e.g., the name of the target file and the user are looked up in the repository to retrieve corresponding user and file attributes).

The icon overlay system retrieves file attributes, according to another embodiment of the present invention, by searching the actual contents of the file. In other words, when it is time to determine the icon overlays to apply, the icon overlay module 'peaks at the file' to identify certain file attributes. The icon overlay system looks at the actual content of the file (e.g., by searching for key words, images, etc.) that gives an indication of the file content. Thereby, file attributes are retrieved based on results of the search performed to display appropriate icon overlays.

The icon overlay system retrieves file attributes, according to another embodiment of the present invention, by reading information (e.g., metadata) that has been embedded into the file. For example, a target file that has been protected and stored in a proprietary Extensible Markup Language (XML) format contains metadata which describes the file id and the policy that has been used to protect the file. Therefore, certain file attributes of the target file are retrieved by reading the embedded metadata. In the case of a file that has been protected and stored in a proprietary Extensible Markup Language (XML) format via an application (e.g., LeveLock®), the target file contains metadata which is used to retrieve file attributes.

At step 350, the icon overlay system determines the icon overlay(s) to apply to the primary icon of the target file based on an aggregate of user and file attributes. According to an embodiment of the present invention, digital asset protection rules are created and utilized by icon overlay module 200 to determine an appropriate icon overlay to be applied based on a combination of user and file attributes. Digital asset protection rules establish correlations between user attributes and file attributes (e.g., roles, categories, policies, etc.). A set of digital asset protection rules governs the outcome for determining the icon overlays to be applied based on the established correlations between user and file attributes. It is to be understood that these rules can be made to specify any correlation between user and file attributes such that specific icon overlays are determined based on the specified correlations, and the determined icon overlay is relevant to the end user. The digital asset protection rules are preferably established and maintained by a system administrator, and stored (e.g., locally in memory of end user system 100, in a local database 105, in remote database 130 over network 100 via database server 120, etc.). The icon overlay module accesses and invokes the established protection rules to determine icon overlay image files to be applied based on an aggregate of user and file attributes. The at least one icon overlay is applied at step 360.

The following examples are presented to provide context for establishing protection rules according to embodiments of the present invention. Roles define collections of users by attributes found in an associated active directory database (e.g., a group of employees assigned to the finance department, a group of users located in a certain zip code, a group of users having management responsibilities, a group of users with access privileges, etc.). Categories represent various types of content that can be contained in a target file. For instance, the security level (e.g., Top Secret, Classified, De-Classified, Confidential, Un-Classified, etc.) of the content is a category. The context of the content (e.g., financial, engineering, managerial, etc.) is another example of a category. Policies are permissions (e.g., grant, prohibit, not associated, etc.) allowed particular roles (e.g., employees of the finance department) with regard to certain actions (e.g., read, write, mark-up, etc.). It is to be understood that roles, categories, and policies can be defined based on any correlation between certain user and file attributes and that these correlations form rules that are invoked to determine appropriate icon overlays to be applied.

In the case where a content repository is consulted, the file attributes of a target file and the user attributes are looked up. Based on the result of the look up, at step 350, the appropriate overlay(s) are determined to apply to the primary icon of the target file for the identified user according to the established rules, at step 360. In the case where the file attributes are retrieved based on searching the actual file contents, an appropriate set of icons are determined based on the file contents at step 350 to apply to the primary icon of the target file for the identified user according to the established rules. In the case where the file attributes are retrieved based on reading the embedded information, an appropriate set of overlay(s) are determined at step 350 from this embedded information (e.g., metadata) according to the established rules.

The primary icon with the at least one applied icon overlay is displayed on the end user system, at step 370. According to embodiments of the present invention, the selected icon overlays are arranged on a primary icon such that, when displayed on the end user system, the primary icon and the icon overlay are clearly recognizable by the end user. For example, the selected icon overlay is arranged on the primary icon such that, at most, only a portion of the primary icon is obstructed from view when the arrangement is displayed. By way of a further example, the color of an icon overlay or the primary icon is changed (e.g., to distinguish between the icon overlay and the underlying primary icon). According to further embodiments of the present invention, when the primary icon and icon overlays are displayed, the icon overlay(s) and/or the primary icon are re-sized (e.g., based on the quantity of icon overlays to be displayed).

A hybrid approach may be employed that incorporates two or more of the above techniques to determine the icon overlay(s) for display and the arrangement of the icon overlay(s) on the primary icon of the target file. For example, the above techniques of reading metadata and consulting a content repository may be combined to use metadata and user information (e.g., username) to query a local or remote database or web service to get further information to determine which overlays are appropriate.

By providing a mechanism(s) that allows overlays to be dynamically assigned, real-time context sensitive overlays can be displayed which provide real value to end user applications. For instance, files actively managed by an Enterprise Digital Rights Management (EDRM) system may employ icon overlays for a variety of reasons. The EDRM server selects icon overlays that infer privileges of a specific end user under the access policy governing use of the managed target file at any given time. Thus, individual icon overlays may be used to provide a visual cue as to whether or not the user is, for example, allowed to view, modify, print, or export a managed file. At a glance, an end user sees what icon overlays have been applied to a primary icon of a target file and immediately knows what operations the user is or is not permitted with regard to the target file.

The EDRM server selects icon overlays that infer the EDRM policy, user role, functional area, or project team that pertains to the end user. The use of distinct icon overlays may be utilized for policies, roles, business units (e.g. Contracts, Legal, Human Resources, Public Relations, Finance, etc), and/or project teams. A user or system administrator browsing EDRM managed files on a file server or network shared drive would readily know the nature of each file by viewing the applied icon overlays.

Figure 4:
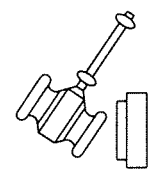
FIG. 4 is an example illustration of icon overlays according to an embodiment of the present invention.
Figure 4:
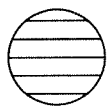
Figure 4:
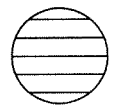
Figure 4:
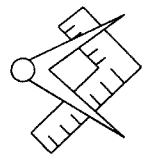
Figure 4:
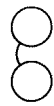
Figure 4:
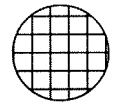
Figure 4:
Figure 4:
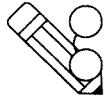
Figure 4:
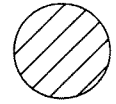

Therefore, embodiments of the present invention determine icon overlays that convey meaningful visual cues about the target file with regard to the identified end user. FIG. 4 shows example images of icon overlays according to an embodiment of the present invention. Icon overlays can indicate the type of content (e.g., financial, engineering, legal, etc.) that the target file contains and file relevance to the end user (e.g., accountant, engineer, attorney, etc.). As a further example, icon overlays indicate the level of access (e.g., read-write, read-only, none, etc.) for an end user with regard to the target file. Icon overlays, for yet another example, indicate the amount of feature access (e.g., all, limited, none, etc.) for the end user with regard to the target file. It is to be understood that icon overlays according to the present invention are not limited to the examples provided herein, but rather are unlimited in size, shape, color, and character.

It is also to be understood that the various icon overlays can be combined in any fashion (e.g., one from each row of FIG. 4) to display a set of overlays over a target file icon in order to show visually to a user a file's context (i.e., the type of data contained in the document), the user's access to the file itself and/or the user's access to the features and functionality of the application for the given file.

As described above and depicted in the flow chart of FIG. 3, the particular group of overlays or pre-fabricated overlay selection is dependent on the users rights or attributes as they are described by a policy and/or back end system that is associated with the file. For instance, each time the user opens a folder containing a "protected" document, a mechanism (e.g., a web service) makes a call to a back end system (e.g., a database) where the file name and perhaps other identifying information about the file is used to determine what the file is and the permissions for the user with regard to the file. Once this information is known, icon module 200 is passed the information to select and display the icon overlays that properly represent to the specific user the appropriate information about the target file.

The at least one icon overlay is applied to the primary icon by icon module 200. The icon module, according to an embodiment of the present invention, makes a copy of the image file of the primary icon retrieved, and superimposes at least one icon overlay in a pre-determined position of the primary icon. It is anticipated that icon overlays can be selected from those illustrated in FIG. 4 (or whatever table of overlay icons is appropriate for the intended document and audience) and placed on the file icon in predefined zones.

Figure 5:
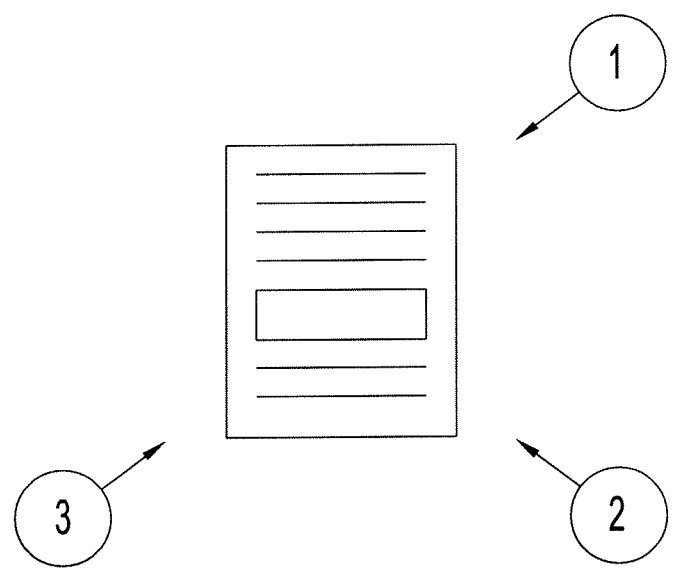
FIG. 5 is an illustration of a primary icon with icon overlay zones for applying icon overlays according to an embodiment of the present invention.

FIG. 5 shows an example of overlay zones 1, 2, and 3 of a primary icon for applying icon overlays according to an embodiment of the present invention. Overlay zones 1, 2, and 3 may indicate an order of placement of overlay icons based on the total number of overlay icons to be applied. The placement of an overlay icon in one of the overlay zones may further convey a certain meaning to the end user. For example, an icon overlay (e.g., indicating a due date) placed in overlay zone 1 may indicate that the file requires immediate attention (e.g., review of a document by the end user is past due by the specified due date), while an icon overlay (e.g., indicating a due date) placed in overlay zone 2 may indicate that the file requires some attention by a future date (e.g., review of a document by the end user is required by the specified due date). An icon overlay (e.g., indicating a due date) placed in overlay zone 3 may indicate that the file no longer requires attention (e.g., a document has already been reviewed prior to the due date).

Figure 6:
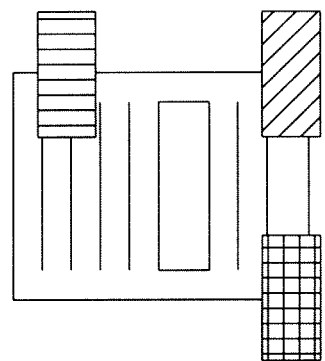
FIG. 6 is an illustration of different example icon overlay configurations for applying icon overlays according to embodiments of the present invention.
Figure 6:
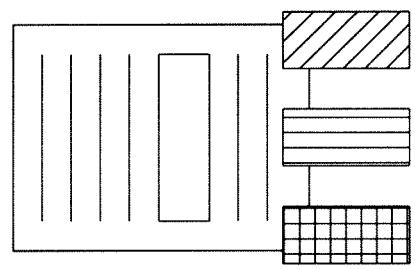
Figure 6:
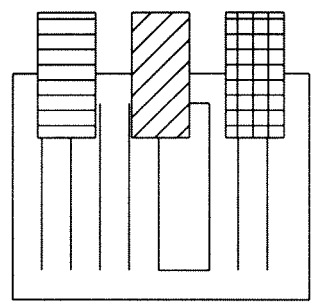

Depending on the end use of the overlays, there could be more or less than three overlay zones, and that the overlay zones could be located in any area within the file icon. FIG. 6 shows several different example icon overlay configurations (e.g., vertical row, horizontal row, corners, etc.) according to further embodiments of the present invention. It should be understood that this mechanism and the "set" of overlays displayed on a primary icon convey meaning to a user through the use of one or more images that appear on the icon. According to a further embodiment of the present invention, the primary icon or the icon overlays can be re-sized or re-positioned to allow for more icon overlays to be applied.

Figure 7:
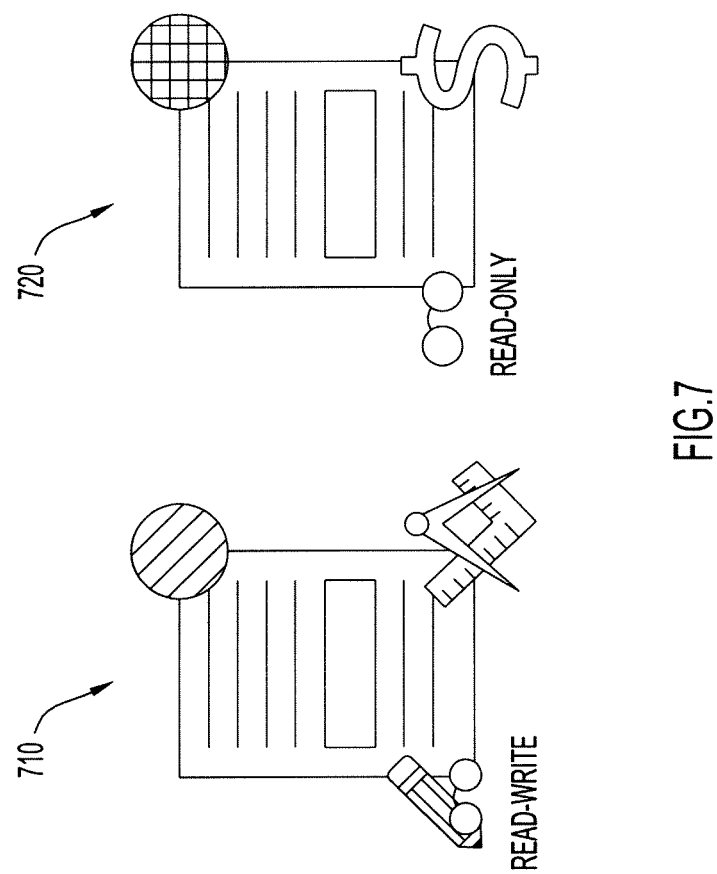
FIG. 7 is an illustration of example icon overlays applied to primary icons of different target files for an end user according to an embodiment of the present invention.

FIG. 7 illustrates icon overlays applied to a primary icon of a target file according to an embodiment of the present invention. The icon overlays depicted in FIG. 7 convey information about particular attributes of the file or content of the file, as well as the end user's rights and permissions with regard to the target file.

By way of example, a first file icon 710 viewed by an end user includes three overlays that convey to the end user a particular set of information with regard to a first target file. The information conveyed is potentially unique and meaningful to the viewing user. The icon overlays are based on an applied policy that is associated with the file and, when evaluated for the target user, provide a specific set of overlay images. For example, the single hatched circle in the upper right hand corner of icon 710 is an expiration indicator that indicates to the user that the target file is available to the user for at least ten more days. The overlay icon at the lower left hand corner of this first icon is an indication to the user that the user has read-and-write access to the target file. The overlay icon on the lower right hand corner of this first icon indicates the type of content (e.g., engineering information) contained in the target file.

With respect to a second file icon 720 viewed by the same user, a different overlay set is displayed based on the unique attributes of the second file with regard to the viewing user. For example, the double hatched circle in the upper right hand corner of the second file icon indicates that this second target file for this user will expire in less than one day. Another differently hatched circle (not shown) indicates that the user's permission to access this second target file has already expired. The overlay icon at the lower left hand corner of the second file icon indicates that the user has only read access to this second target file when opened. The icon on the lower right hand corner of file icon 720 indicates that this particular target file is a financial document.

It is to be understood that the dynamic icon overlays may be combined in any fashion and the type of information conveyed by the applied icon overlays may be any desired information. Different applications, however, may find different types of icons useful for conveying information specific to that application. For example, in a DRM system, a document whose usage rights are about to expire for a particular user may want to convey this information to a user using a particular icon overlay. In addition, a document that is of a particular type may want to convey its type to a user. Furthermore, documents that have certain access privileges may want to convey a user's access privilege for the particular document in a visual way using an icon overly specifically meant for that user. It should be understood that the nature and variety of information that can be conveyed using icon overlays is not limited to the examples set forth herein.

The concept of applying dynamic icon overlays, according to present invention embodiments, can be extended to other functionality. For example, a folder browser application including custom columns for displaying the icon overlays to allow file sorting and file search capabilities based on the user and file attributes, thus making this system of icon overlays even more robust and useful to end users. For example, a user could perform a search for all documents that will expire in less than one day, or sort all documents by type (e.g. Engineering, Financial, Legal, etc.).

The present invention embodiments may be utilized for various applications. For example, a present invention embodiment may be used to determine and apply icon overlays to convey user specific information regarding any type of target file for any application. It is to be understood that a set of icon overlays and rules governing which icon overlays are determined to be applied can be defined for any application. In a policy based system where an asset (i.e., target file) is protected by a specific policy and data security is the primary goal, a set of overlays can be employed to convey to end users the security stance that is currently being applied to the asset in question. Given a set of overlays, a user can quickly ascertain the type of file they are looking at, if they are looking at a sensitive file, if they will have access to the file, or if they are looking at a file that needs there immediate attention.

In an Information Rights Management/Data Rights Management (IRM/DRM) system such things as: duration of access, type of access, or time of access to assets are traditionally managed. Using a set of appropriate icon overlays, an IRM/DRM system can quickly convey the rights and privileges of an end user with regard to a specific asset.

In an environment where conveying information (e.g., file type, file content, etc.) is important (and security is a secondary goal), these icon overlays can be applied in numerous ways, and combinations. End users can gain a good idea of what is contained in the file by merely glancing at the overlay combination.

The end user system of present invention embodiments may be implemented by any quantity of any personal or other type of computer or processing system (e.g., IBM-compatible, Apple, Macintosh, laptop, palm pilot, microprocessor, mobile phone, etc.). The end user system may include any commercially available operating system (e.g., Windows, OS/2, Unix, Linux, etc.), any commercially available and/or custom software (e.g., communications software, icon module software, etc.), any types of input devices (e.g., keyboard, mouse, microphone, voice recognition, touch screen, etc.), and any types of output devices (e.g., monitor, display, screen, graphical user interface, television, digital projector, etc.). It is to be understood that the software of the dynamic icon overlay system may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control. The computer system may alternatively be implemented by hardware or other processing circuitry.

The various functions of the dynamic icon overlay system may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, ad-hoc network, etc.). The software and/or algorithms described above and illustrated in the flow charts and diagrams may be modified in any manner that accomplishes the functions described herein.

The dynamic icon overlay system, according to present invention embodiments, may communicate between parts of the system distributed over a network via any communications medium (e.g., satellite, WAN, LAN, Internet, Intranet, modem, wireless, ad-hoc network, etc.). The system may use one or more communication mediums to communicate between the distributed parts over the network.

The dynamic icon overlay system may accommodate any type of file in any desired format (e.g., document file formats (e.g., ASCII, plain text, any word processor or other application format, etc.), image file formats (e.g., JPEG, GIF, BMP, etc.), executables file formats (e.g., .EXE, etc.), etc.). The dynamic icon overlay system may utilize any quantity of any suitable overlay icons to identify any type of user attribute (e.g., access permissions, location, security level of an end user system network connection, etc.) and/or any type of file attribute (e.g., file contents include financial information, file type is an image file, file contents include secure information, etc.) and may compare the identified user and file attributes to any policy correlating any user attribute with any file attribute.

The dynamic icon overlay system may be implemented as a separate stand-alone system or may be in the form of an embeddable system (e.g., within another system, as an embeddable software component within other software, etc.). The dynamic icon overlay system may further function as a server in communication with client or user systems via any communications medium (e.g., network, WAN, LAN, Internet, Intranet, modem, etc.) to process dynamic icon overlay calls for end user systems. The dynamic icon overlay software may be available on a recordable medium (e.g., magnetic or optical mediums, magneto-optic mediums, floppy diskettes, CD-ROM, memory devices, etc.) for use on stand-alone systems or systems connected by a network or other communications medium, and/or may be downloaded (e.g., in the form of carrier waves, packets, etc.) to systems via a network or other communications medium.

The dynamic icon overlay system, according to present invention embodiments, may use any type of database or other storage unit to store any type of data (e.g., user attributes, file attributes, icon overlays, etc.) and any form of data (e.g., documents, images, text, etc.). The database can be any type of database or other storage unit (e.g., Subject-area (SADB), Analytical, Data Warehouse, Distributed, End-user, External, Hypermedia, Navigational, In-memory, Document-oriented, Real-time, Relational, etc.). The database of present invention embodiments may be queried for information by any suitable technique (e.g., using Structured Query Language (SQL), Search-oriented Architecture (SOA), etc.).

The dynamic icon overlay system may utilize any conventional or other icon handler of any end user system or server system, and may apply any icon overlay to any primary icon in any manner and at any point during processing (e.g., initially, during user attribute identification, during file attribute identification, etc.). The icon overlays may be provided in any desired fashion to convey information about the file that is relevant to the end user (e.g., any symbols or images to indicate certain file contents, a date indicator to convey to the end user that the end user has access to the file until the date indicated, etc.). The primary icons and icon overlays can be any image, size, or shape. The primary icons and icon overlays, in combination or independently, can be re-sized or re-shaped. The overlay icons can be applied at any location on or proximate a primary icon.

The rules or policies may establish any correlations (e.g., roles, categories, policies, etc.) between any user attribute and any file attribute in any quantity and any combination thereof, may be implemented by any desired data structure (e.g., file, array, linked-list, stack, queue, etc.), and may include any desired correlation. The rules or policies may further be manipulated by a user or system administrator. The rules or policies may be based on any desired criteria, where compliance with all or any portion of the criteria may satisfy the rule or policy.

The present invention may be utilized for various applications. For example, the present invention may be used: in a policy based system (e.g., to convey the security stance being applied to files, to convey the sensitivity of the content of files, to convey that files require attention, etc.), in a digital rights management system (e.g., to manage duration of access to files, type of access to files, time of access to files, etc.), etc. As a stand-alone application, the present invention may assist administrators to compile a comprehensive list of users that meet a certain criteria with regard to certain user and file attributes (e.g., a list of users that have access to a secure file, a list of users whose access to a certain file are pending termination, etc.). In the form of an embedded application, the present invention can improve operability of applications with regard to user relevant attributes of a file conveyed by an icon overlay. For example, an application can activate/deactivate a certain function or operation of the application based on criteria relating to an icon overlay superimposed on a primary icon of a target file and the icon overlay indicating that the end user is allowed/denied certain permissions for the target file.

From the foregoing description, it will be appreciated that the invention makes available a novel dynamic icon overlay system and method for determining an icon overlay and applying the icon overlay to a primary icon of a target file, wherein the icon overlay is determined based on an aggregate of user and file attributes. Having described preferred embodiments of a dynamic icon overlay system and method for determining and applying an icon overlay to a primary icon of a target file, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of applying a dynamic icon overlay to a primary icon of a target file, the method comprising:
    identifying an end user and a target file;
    retrieving a primary icon of the target file based on a file type of the target file, wherein the primary icon has a plurality of overlay zones, each overlay zone including a zone level that conveys a relative level of attention for the end user;
    retrieving file data associated with the target file comprising information configured to indicate attributes of the target file;
    retrieving a user profile of the end user comprising information configured to indicate attributes of the end user;
    aggregating user specific content from the information in the file data and the information in the user profile;
    determining an icon overlay to be applied to the primary icon of the target file based on the aggregated user specific content such that the icon overlay conveys to the end user information about the target file that is relevant to the end user;
    determining a zone level for the icon overlay for the end user based on the aggregated user specific content;
    applying the icon overlay to an overlay zone of the primary icon based on the zone level such that the overlay zone further conveys to the end user information about the target file that is relevant to the end user; and
    displaying the primary icon with the applied icon overlay at an end user system of the end user, wherein the icon overlay for the target file is different for at least two end users based on their respective aggregated user specific contents when observed on their respective end user systems.

2. The method of claim 1, wherein determining the icon overlay further comprises:
    comparing at least one user attribute in the user profile and at least one file attribute in the file data to a policy governing correlations between user attributes, file attributes, and icon overlays.

3. The method of claim 1, wherein determining the icon overlay further comprises:
    determining a first icon overlay to be applied to a first primary icon of the target file on a first end user system based on at least one user attribute of a first end user in the user profile and at least one file attribute of the target file in the file data; and
    determining a second icon overlay to be applied to a second primary icon of the target file on a second end user system based on at least one user attribute in a user profile of a second end user and the same at least one file attribute of the target file, wherein the second icon overlay to be applied to the second primary icon of the target file is different from the first icon overlay.

4. The method of claim 1, further comprising:
    accessing a content repository to retrieve one or more of: the user profile, the file data, and the icon overlay.

5. The method of claim 1, wherein retrieving the file data further comprises one or more of:
   searching content of the target file to retrieve the file data; and
   reading information that has been embedded into the target file to retrieve the file data.

6. The method of claim 1, further comprising resizing at least one of: the primary icon and the icon overlay.

7. The method of claim 1, further comprising:
   detecting a change in the aggregated user specific content; and
   dynamically changing in real-time the overlay zone of the icon overlay or the icon overlay when the change in the aggregated user specific content indicates a change in zone level for the end user.

8. The method of claim 1, wherein determining a relative level of attention comprises determining a priority level of the icon overlay for the end user based on the aggregated user specific content and applying comprises applying the icon overlay to an overlay zone based on priority.

9. A system for applying a dynamic icon overlay to a primary icon of a target file, the system comprising:
   one or more computers configured to display the primary icon with the applied icon overlay at an end user system of an end user, said one or more computers including:
      a dynamic icon overlay module configured to:
         identify an end user and a target file;
         retrieve a primary icon of the target file based on a file type of the target file, wherein the primary icon has a plurality of overlay zones, each overlay zone including a zone level that conveys a relative level of attention for the end user;
         retrieve file data associated with the target file comprising information configured to indicate attributes of the target file;
         retrieve a user profile of the end user comprising information configured to indicate attributes of the end user;
         aggregate user specific content from the information in the file data and the information in the user profile;
         determine an icon overlay to be applied to the primary icon of the target file based on the aggregated user specific content such that the icon overlay conveys to the end user information about the target file that is relevant to the end user;
         determine a zone level for the icon overlay for the end user based on the aggregated user specific content;
         apply the icon overlay to an overlay zone of the primary icon based on the zone level such that the overlay zone further conveys to the end user information about the target file that is relevant to the end user; and
         display the primary icon with the applied icon overlay at the end user system of the end user, wherein the icon overlay for the target file is different for at least two end users based on their respective aggregated user specific contents when observed on their respective end user systems.

10. The system of claim 9, wherein the dynamic icon overlay module is configured to compare at least one user attribute in the user profile and at least one file attribute in the file data to a policy governing correlations between user attributes, file attributes, and icon overlays.

11. The system of claim 9, wherein the dynamic icon overlay module is configured to:
   determine a first icon overlay to be applied to a first primary icon of the target file on a first end user system based on at least one user attribute of a first end user in the user profile and at least one file attribute of the target file in the file data; and
   determine a second icon overlay to be applied to a second primary icon of the target file on a second end user system based on at least one user attribute in a user profile of a second end user and the same at least one file attribute of the target file, wherein the second icon overlay to be applied to the second primary icon of the target file is different from the first icon overlay.

12. The system of claim 9, further comprising:
   a content repository configured to store user attributes, user profiles, file attributes, file data, and icon overlays, wherein the icon overlay module is further configured to access the content repository to retrieve one or more of: the user profile, the file data, and the icon overlay.

13. The system of claim 9, wherein the dynamic icon overlay module is further configured to search content of the target file to retrieve the file data.

14. The system of claim 9, wherein the dynamic icon overlay module is further configured to read information that has been embedded into the target file to retrieve the file data.

15. The system of claim 9, wherein the dynamic icon overlay module is further configured to resize at least one of: the primary icon and the icon overlay to arrange the icon overlay in the overlay zone.

16. The system of claim 9, wherein the dynamic icon overlay module is further configured to:
   detect a change in the aggregated user specific content; and
   dynamically change in real-time the overlay zone of the icon overlay or the icon overlay when the change in the aggregated user specific content indicates a change in zone level for the end user.

17. A program product apparatus including a non-transitory computer readable medium with computer program logic recorded thereon for applying a dynamic icon overlay to a primary icon of a target file, the computer program logic comprising:
   a dynamic icon overlay module configured to:
      identify an end user and a target file;
      retrieve a primary icon of the target file based on a file type of the target file, wherein the primary icon has a plurality of overlay zones, each overlay zone including a zone level that conveys a relative level of attention for the end user;
      retrieve file data associated with the target file comprising information configured to indicate attributes of the target file;
      retrieve a user profile of the end user comprising information configured to indicate attributes of the end user;
      aggregate user specific content from the information in the file data and the information in the user profile;
      determine an icon overlay to be applied to the primary icon of the target file based on the aggregated user specific content such that the icon overlay conveys to the end user information about the target file that is relevant to the end user;
      determine a zone level for the icon overlay for the end user based on the aggregated user specific content;
      apply the icon overlay to an overlay zone of the primary icon based on the zone level such that the overlay zone further conveys to the end user information about the target file that is relevant to the end user; and display the primary icon with the applied icon overlay at an end user system of the end user wherein the icon overlay for the target file is different for at least two end users based on their respective aggregated user specific contents when observed on their respective end user systems.

18. The apparatus of claim 17, wherein the dynamic icon overlay module is configured to compare at least one user attribute in the user profile and at least one file attribute in the file data to a policy governing correlations between user attributes, file attributes, and icon overlays.

19. The apparatus of claim 17, wherein the dynamic icon overlay module is configured to:

determine a first icon overlay to be applied to a first primary icon of the target file on a first end user system based on at least one user attribute of a first end user in the user profile and at least one file attribute of the target file in the file data; and determine a second icon overlay to be applied to a second primary icon of the target file on a second end user system based on at least one user attribute of a second end user in a user profile for the second end user and the same at least one file attribute of the target file, wherein the second icon overlay to be applied to the second primary icon of the target file is different from the first icon overlay.

20. The apparatus of claim 17, wherein the dynamic icon overlay module is further configured to access a content repository to retrieve one or more of: the user profile, the file data, and the icon overlay.

21. The apparatus of claim 17, wherein the dynamic icon overlay module is further configured to search content of the target file to retrieve the file data.

22. The apparatus of claim 17, wherein the dynamic icon overlay module is further configured to read information that has been embedded into the target file to retrieve the file data.

23. The apparatus of claim 17, wherein the dynamic icon overlay module is further configured to resize at least one of: the primary icon and the icon overlay to arrange the icon overlay in the overlay zone.

24. The apparatus of claim 17, wherein the dynamic icon overlay module is further configured to:

detect a change in the aggregated user specific content; and dynamically change in real-time the overlay zone of the icon overlay or the icon overlay when the change in the aggregated user specific content indicates a change in zone level for the end user.

* * * * *